Aug. 13, 1935.                C. S. LARSON                2,010,820
                         PIPE HANDLING APPARATUS
                           Filed June 2, 1933            3 Sheets-Sheet 3
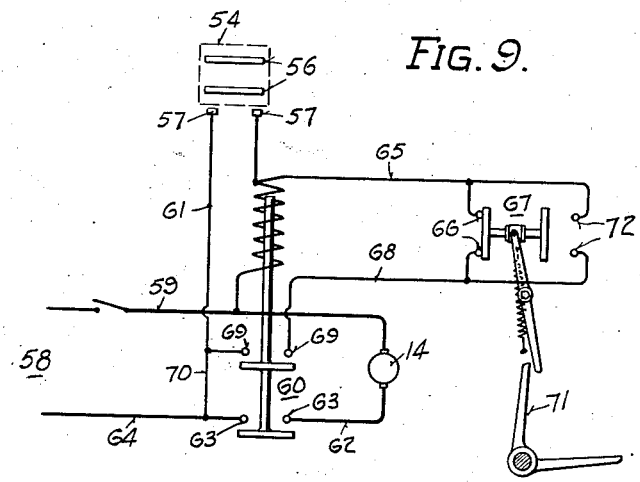
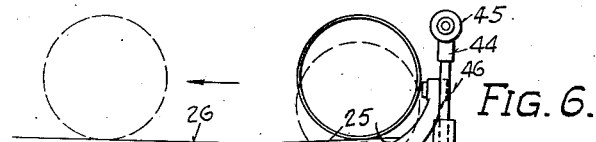
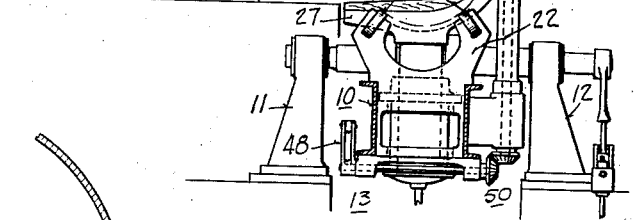
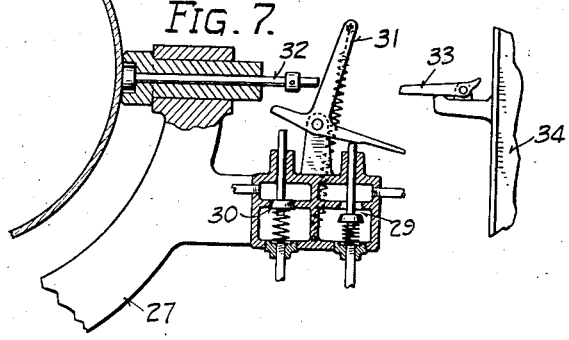
INVENTOR.
Clas S. Larson
BY
ATTORNEY.

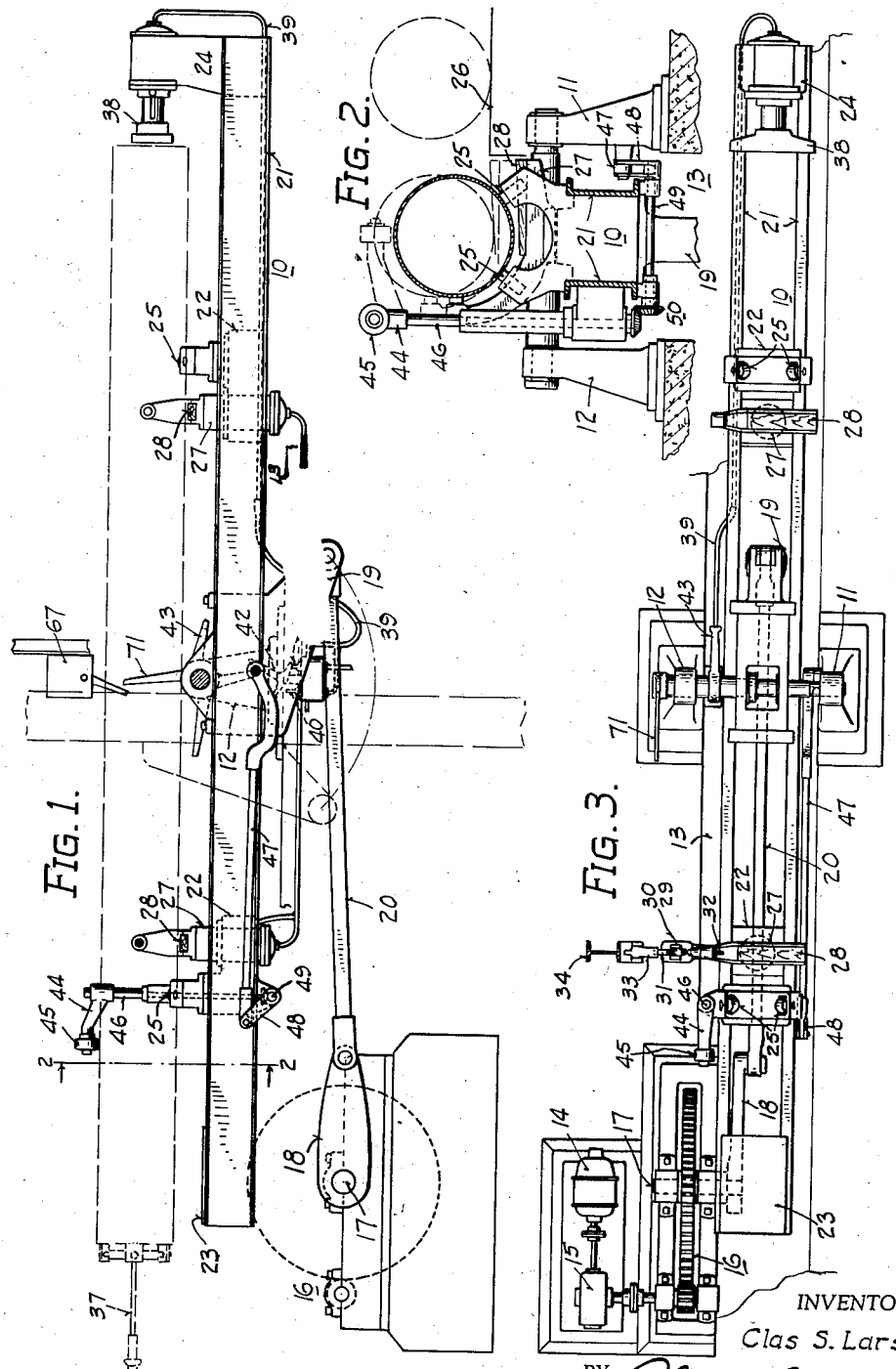

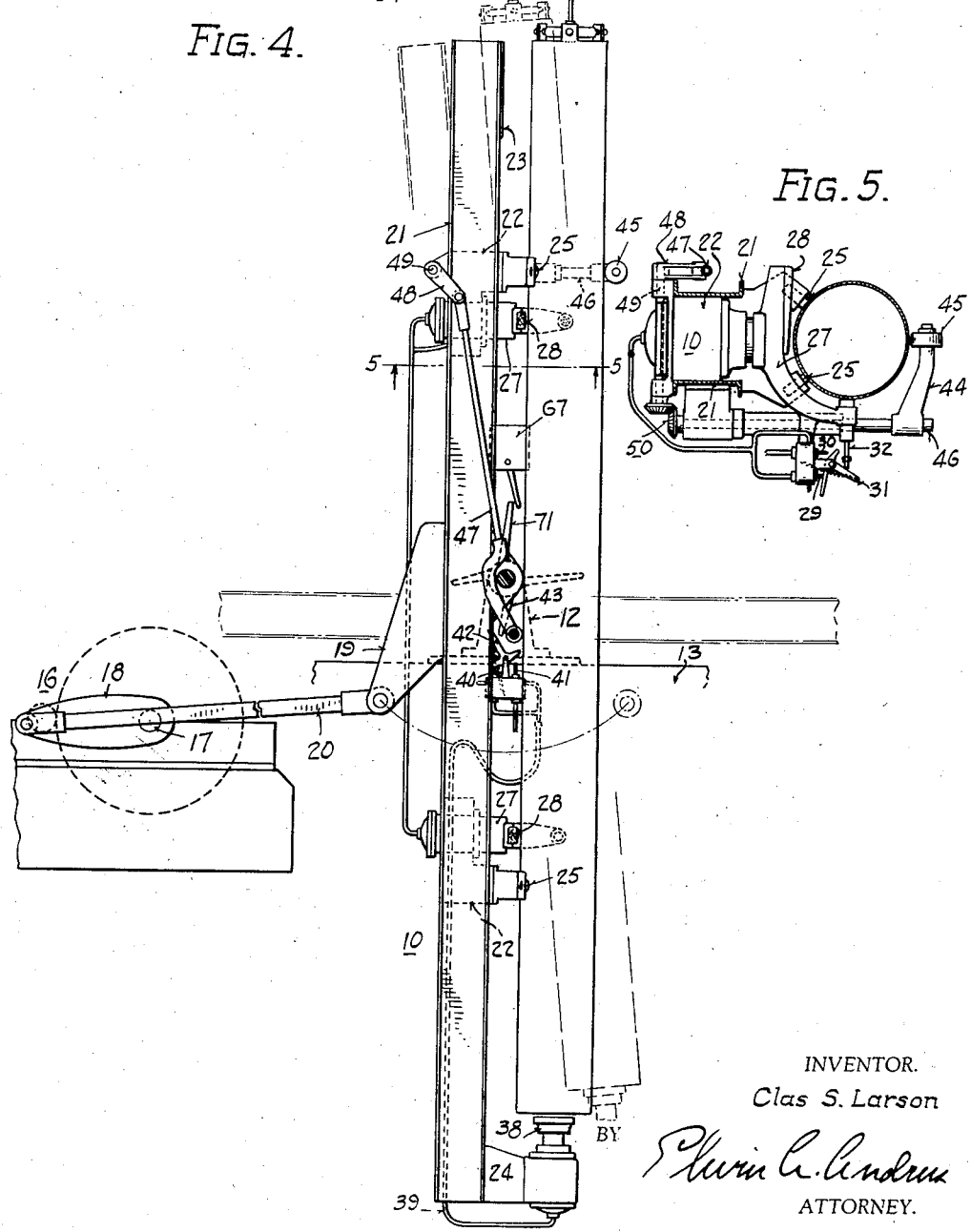

Patented Aug. 13, 1935

2,010,820

UNITED STATES PATENT OFFICE 2,010,820

PIPE HANDLING APPARATUS

Clas S. Larson, Milwaukee, Wis., assignor to A. O. Smith Corporation, Milwaukee, Wis., a corporation of New York Application June 2, 1933, Serial No. 673,952

13 Claims. (Cl. 214—1)

The invention relates generally to apparatus for handling heavy articles in the process of manufacture.

The object of the invention is to provide for delivering pipe or other heavy articles in a predetermined position to a machine, or receiving such articles from a machine, and discharging them in a predetermined position.

For a fuller understanding of the nature and objects of the invention, reference should be had to the following detailed description taken in conjunction with the accompanying drawings, in which:

Figure 1 is a view in side elevation showing pipe handling apparatus constructed in accordance with the invention;

Fig. 2 is an enlarged view in section taken along the line 2—2 of Fig. 1;

Fig. 3 is a top plan view of the pipe handling apparatus illustrated in Fig. 1;

Fig. 4 is a view in side elevation similar to that shown in Fig. 1 with the carriage in a vertical position;

Fig. 5 is an enlarged view of a section of the pipe handling apparatus taken along the line 5—5 of Fig. 4;

Fig. 6 is an enlarged view, partly in section and partly in side elevation, of a pipe receiving apparatus provided on the carriage;

Fig. 7 is an enlarged view, partly in section and partly in side elevation, showing the construction of control apparatus provided for governing the operation of a support provided on the cradle for receiving the pipe when in a horizontal position;

Fig. 8 is a view, partly in section and partly in side elevation, of control apparatus for the apparatus when operated to receive the articles when in a vertical position and discharge them in a horizontal; and Fig. 9 is a diagrammatic view of a control system for operating the pipe handling apparatus in synchronism with other plant machinery.

Referring now to the drawing and Figs. 1 to 3 in particular, the apparatus for handling heavy articles illustrated as the preferred embodiment of my invention comprises a cradle 10 pivotally mounted in standards 11 and 12 over a pit 13. As shown in Figs. 1 and 2, the standards are disposed at the center of the cradle. Therefore when the cradle is loaded, it is approximately balanced about its pivotal mounting and may be rotated into a vertical position with a small expenditure of energy.

When the cradle is loaded with a heavy article such as a steel pipe, it is preferable to rotate it slowly from its horizontal position to a vertical position so that it will not acquire great momentum and may be stopped without a strain on the operating mechanism.

The drive for operating the cradle comprises an electric motor 14 connected through bevel gears 15, a train of reduction gears 16, and drive shaft 17 to a crank 18. An arm 19 is bolted to the cradle near its pivot point and a connecting rod 20 extends between the arm 19 and the crank 18.

The throw of the crank 18 and the length of the arm 19 will be proportioned to meet the operating conditions and to suit the drive. In this particular case, the arm 19 is designed and positioned on the cradle 10 in such manner that it travels in the arc of a circle about the pivot point of the cradle. The speed at which the cradle travels is slow as it approaches either limiting position and greatest midway between its horizontal and vertical positions. Further, when the cradle is in its horizontal or vertical positions, the axis of the drive shaft 17 and the axes of the pivotal connections of the connecting rod 20 to the arm 19 and the crank 18 stand in line, as shown in Figs. 1 and 3, respectively. In such manner, the cradle is locked in these two positions.

The cradle 10 comprises channel member 21 extending the length of the cradle and firmly supported in spaced relation by castings 22 disposed intermediate the ends of the channel members, a plate 23 at the left end as shown in Fig. 3, and a casting 24 at the right end as shown in Fig. 1. Seats for supporting the pipe are provided on the castings 22. The upper portions of the castings 22 are arcuate in shape. A plurality of rollers 25 are mounted in the arcuate portion of the castings 22 to carry the pipe and facilitate its movement longitudinally of the cradle. The rollers 25 may be mounted in any suitable manner well known in the art. As shown in Fig. 2, they are disposed in the arc of a circle to conform to the shape of the pipe to be handled. Only two rollers are shown in each support but any number required to meet the operating conditions may be utilized.

The pipe may be delivered to the cradle in any suitable manner and in this instance a table or platform 26 is provided. In Fig. 2 the platform is shown slightly higher than the rollers provided in the castings 22 for receiving the pipe.

In order to lower the pipe from the platform 26 onto the rollers, two jacks 27 each having a rail section 28 mounted thereon are provided.

The outer edges of the rails are substantially flush with the platform 26 and they slope downwardly as they extend inwardly in such manner that when the pipe is started into the cradle it will immediately roll into proper position. The jacks 27 have arms which extend upwardly on one side to prevent the pipe from rolling over the cradle.

The movement of the jacks 27 along vertical lines is small, being only the distance required to carry the pipe from the level of the platform to the rollers 25. The jacks will move far enough downwardly to permit the pipe to seat in the rollers and move longitudinally without any obstruction.

In the embodiment of the invention illustrated, the jacks 27 are operated by compressed air which may be supplied from any suitable source, not shown. In order to control the admission and exhaust of compressed air to and from the jacks, a pair of valves 29 and 30, such as shown in Fig. 7, is provided. A spring controlled toggle 31 is provided for operating the valves 29 and 30. In order to operate the toggle 31 when a pipe is rolled onto the rails 28, a slidably mounted plunger 32 disposed to be actuated by the pipe is provided. The plunger, toggle 31, and valves 29 and 30 are carried by the arm of one of the jacks 27.

When the pipe or other articles have been delivered in a vertical position, the toggle 31 may be actuated to operate valve 30 and admit compressed air to the jacks to raise the rails 28 to the position shown in Fig. 2 by means of latch 33. The latch is shown in Figs. 3 and 7 as mounted on a post 34 in proper position to engage the toggle 31 when the cradle approaches its horizontal position.

Apparatus of this kind is usually employed for loading pipe or other heavy articles onto conveyor systems or elevators, such as shown generally at 35. It may also be used for unloading. The particular conveyor system illustrated is provided with a car 36 having its lower end slotted to receive the end of a suspending device 37.

In order to support the pipe at the proper elevation for projecting the head of the suspending device 37 into the slot in the car 36 and lower it until the head of the suspending device engages in the car, another jack 38 is mounted on the casting 24 at the end of the cradle. This jack may be operated by any kind of fluid pressure. Compressed air is utilized and may be supplied from the same source, as the jacks 27, through pipes and a flexible hose 39.

The upper end or plunger of the jack 38 is large enough to receive the end of the pipe and support it at the proper height for the suspending device 37 to engage in the slot provided in the car 36 when the cradle is rotated into its vertical position. The admission and exhaust of compressed air to and from the jack 38 is controlled by a pair of valves 40 and 41 which are disposed to be actuated by a spring biased toggle 42. The valves and toggle are mounted independently of the cradle on any suitable support.

The proper functioning of the jack 38 is effected by means of a striker 43 provided with two arms which straddle the arm of the toggle 42. The striker 43 is mounted to rotate about a common axis with the cradle, as shown in Fig. 1, and disposed to actuate the toggle 42 in one direction when the cradle approaches a vertical position and in the opposite direction when it approaches its horizontal position, thus actuating the valves 40 and 41 to admit and exhaust the compressed air to and from the jack.

The pipe is held in position in the cradle on rollers 25 by means of an arm 44 which is operated in synchronism with the cradle. The arm is provided with a roller 45 corresponding to the rollers 25 provided on the castings 22 carried by the cradle.

The arm 44 is carried by a shaft 46 (see Fig. 5) and disposed to be actuated into a position where it extends transversely of the cradle to a locking position with the roller 45 directly in line with the pipe as the cradle moves toward its vertical position and into a position parallel to and clear of the cradle as the latter approaches its horizontal position.

The arm 44 may be operated in any suitable manner as the cradle is rotated about its pivot point and in this instance a rod 47 is pivotally connected to the standard 11 and to a crank arm 48 which operates a shaft 49 pivotally suspended from the cradle. As shown in Figs. 2 and 5, the shaft 49 is connected through a pair of bevel gears 50 to the shaft 46. Therefore as the cradle is actuated, the arm 44 is oscillated to and from its locking position.

The conveyor system 35 referred to hereinbefore comprises a conveyor chain 51 carried by the sprocket 52. This conveyor chain 51 delivers the cars 36 to the elevator 53 periodically. The time between the arrival of consecutive cars 36 will depend on the speed at which the conveyor chain is moving.

In order to operate the cradle 10 of the pipe handling apparatus in synchronism with the conveyor system to insure the positioning of a car 36 to receive the pipe when the cradle is moved into its vertical position, a control system for the motor 14 is provided which is driven from the sprocket 52. The control system includes a drum 54 which is connected to the sprocket 52 through a chain and sprocket drive shown generally at 55. The drum 54 may be driven at any predetermined speed relative to the sprocket 52. The relative speeds of the drum 54 and sprocket 52 may be varied by varying the size of the sprockets of the chain and sprocket drive 55.

The control system can be described best by describing its operation and so it will be described in detail in the description of the operation of the apparatus which follows.

Assuming now that the cradle 10 stands in its horizontal position with the jacks 27 and 38 in their uppermost positions, then pipe provided with suspending devices 37 may be rolled from the platform 26 onto the rails 28. As the pipe rolls into position, it engages the plunger 32, best shown in Fig. 7, and projects it against the spring biased toggle 31 provided for controlling the valves 29 and 30.

When the valve 29 is opened, the air is exhausted from the jacks 27 and the pipe is lowered to seat on the rollers 25 carried by the castings 22 forming part of the cradle 10. The cradle stands loaded ready to swing the pipe into a vertical position and deliver it to the car 36.

The drum 54 which is driven from the conveyor chain 51 is provided with two contact segments 56 which are disposed to bridge the contact fingers 57 and initiate the operation of the motor 14 to operate the cradle to deliver a pipe each time a car is positioned to receive it.

The engagement of the contact fingers by the contact segments 56 establishes a switch actuating circuit which may be traced from the positive terminal of any suitable power source 58 through conductor 59, the actuating coil of the motor switch 60, contact fingers 57 bridged by contact segment 56 and conductor 61, back to the power source 58. The motor switch 60 is actuated establishing a motor circuit.

The motor circuit extends from the energized conductor 59, through the motor 14, conductor 62, contact fingers 63 bridged by the lower contact member of the motor switch 60 and conductor 64 to the negative terminal of the power source 58. The motor operates and the cradle is moved toward its vertical position. At the same time that the motor circuit is closed, a holding circuit for the motor switch 60 is established. The holding circuit extends from the energized conductor 59, through the actuating coil of the switch 60, conductor 65, contact fingers 66 bridged by the elevator contact member of the spring biased toggle switch 67, conductor 68, contact fingers 69 bridged by the upper contact member of the motor switch 60, and conductors 70 and 64 to the negative terminal of the source of supply 58. The motor switch 60 will be retained in its closed position as long as the toggle switch 67 stands in the position illustrated.

As the cradle swings upwardly, the arm 44 is actuated to a position extending transversely of the cradle, positioning the roller 45 above the pipe, thus locking the latter in the cradle.

As the cradle moves towards its vertical position, the pipe will slide into engagement with the jack 38, and when the cradle stands in its vertical position the pipe is carried by the jack. The striker 43 which is actuated by the cradle operates the toggle 42 moving it to the left as viewed in Fig. 8 before the cradle reaches its vertical position.

The operation of the toggle 42 to the left opens the valve 40 and the air is exhausted from the jack 38 and the pipe is lowered along vertical lines. The time required for exhausting the air from the jack 38 is sufficient to permit the cradle to reach its vertical position and project the head of the suspending device 37 into the slot provided in the car 36 to receive it before the jack reaches its lowermost position. When the air has been completely exhausted from the jack 38, the pipe has been lowered through a great enough distance to seat the head of the suspending device 37 in the car 36. The pipe is then carried by the car.

The elevator 53 which is part of the conveyor system may now move upwardly and withdraw the pipe from the cradle.

In order to stop the motor 14 when the cradle reaches its vertical position, a striker 71, shown in Fig. 9, is oscillated by the cradle and actuates the toggle switch 67 projecting its contact members to the right. The holding circuit for the motor switch 60 is interrupted and the motor switch drops to its open position interrupting the motor circuit.

The interruption of the motor circuit is timed to occur when the crank arm 18 and connecting rod 20 stand in line and the cradle is locked in its vertical position. The cradle stands in the vertical position until the next contact segment of the drum 54 bridges the contact fingers 57 again establishing an actuating circuit for the motor switch 60 and reestablishing the motor circuit.

When the motor circuit is closed the second time, a new holding circuit is established for the motor switch 60. This holding circuit may be traced from the energized conductor 59 through the actuating coil of the switch 60, conductor 65, contact fingers 72 bridged by the right-hand contact member provided on the toggle switch 67, conductor 68, contact fingers 69 bridged by the upper contact member of the motor switch 60 and conductors 70 and 64 to the negative terminal of the source of supply.

The motor is again set in operation and the cradle is actuated from its vertical position to its horizontal position. The circuits established for operating the motor to actuate the cradle to its horizontal position are the same as traced hereinbefore for causing the operation of the motor to move the cradle from its horizontal position to its vertical position.

As the cradle swings downwardly towards its horizontal position, the toggle 31 strikes the latch 33 and is thrown to its opposite position closing the valve 30 and permitting the valve 29 to open. Air is admitted to the jacks 27 and they project the rails 28 upwardly to their pipe receiving positions. The striker 43 operates the toggle 42 opening the valve 40 and permitting the valve 41 to close. When the valve 40 is opened, air is admitted to the jack 38 causing it to move to its pipe receiving position.

The crank arm 48 is actuated as the cradle swings towards its horizontal position and the arm 44 is moved from its position extending transversely of the cradle to a position where it extends parallel to it. When the arm 44 has been actuated to its position extending parallel to the cradle, the latter is opened to receive another pipe.

From the foregoing it will be evident that the apparatus disclosed may be utilized for delivering heavy articles, such, for example, a pipe to a plant or for receiving pipe from a plant and discharging it in a horizontal position. The only changes that would be necessary would be the reversing of the operation of the jacks 27 and 38. This change is so obvious that it has not been illustrated.

Since numerous changes may be made in the above described construction and different embodiments of the invention may be made without departing from the spirit and scope thereof, it is intended that all matters contained in the above description or shown in the accompanying drawings shall be interpreted as illustrative and not in a limiting sense.

I claim:

1. Pipe handling apparatus comprising a carriage for receiving the pipe, means for retaining the pipe in the carriage, means for actuating the carriage to a predetermined position, and means disposed for operation upon the movement of the carriage to actuate the pipe retaining means.

2. Pipe handling apparatus comprising, in combination, a carriage for receiving the pipe pivotally mounted for rotation through a predetermined angle for delivering the pipe, means for rotating the carriage about its pivot point, means for retaining the pipe in position with the carriage, and means responsive to the rotation of the carriage about its pivot point for actuating the retaining means.

3. In pipe handling apparatus, in combination, a carriage for receiving the pipe, the carriage being pivotally mounted to permit the rotating of the pipe into different predetermined positions, and a support provided on one end of the carriage for receiving the pipe when it is rotated to a vertical position, said support being movable whereby the pipe may be moved to a predetermined level when in the vertical position.

4. Pipe handling apparatus, in combination, a carriage for the pipe, a plurality of rollers mounted on the carriage for receiving the pipe and facilitating movement longitudinally of the carriage, a support at one end of the carriage for receiving the pipe as it is rotated toward a vertical position, and means automatically operable upon the rotation of the carriage to effect the operation of the support to release the pipe when in a vertical position.

5. Pipe handling apparatus comprising, in combination, a pivotally mounted carriage for the pipe, a plurality of rollers mounted on the carriage forming a bed for the pipe and facilitating movement of the pipe longitudinally of the carriage, means for retaining the pipe in the bed, the retaining means being automatically operable upon the movement of the carriage.

6. Pipe handling apparatus comprising, in combination, a carriage for the pipe, the carriage being pivotally mounted to permit its rotation to different predetermined positions, means for actuating the carriage, a plurality of rollers provided on the carriage forming a bed for the pipe, and facilitating the movement of the pipe longitudinally of the carriage, a support at the end of the carriage for receiving the pipe when it is rotated toward a vertical position, and means automatically operable upon the rotation of the pipe to a vertical position for effecting the operation of the support to release the pipe.

7. Pipe handling apparatus comprising, in combination, a pivotally mounted carriage for the pipe, means for actuating the carriage, means for receiving the pipe mounted on the carriage, means disposed for operation upon the delivery of the pipe to the receiving means for effecting the lowering of the pipe into the carriage, a support on the carriage for receiving the end of the pipe as it is rotated toward a vertical position, and means automatically operable upon the rotation of the carriage to place the pipe in the vertical position for actuating the support.

8. A pipe handling apparatus comprising, a horizontal cradle for receiving a pipe, means for tipping the cradle to vertical position for delivering or receiving a pipe, and means operated by said tipping means for holding the pipe in position during movement of the cradle.

9. A pipe handling apparatus comprising, a horizontal cradle for receiving a pipe, means for tipping the cradle to vertical position for delivering or receiving a pipe, and means operated by said tipping means for holding the pipe in position during movement of the cradle, said last named means being operable to release the pipe for vertical movement in horizontal and vertical positions of the cradle.

10. A pipe handling apparatus comprising, a track for supporting a pipe for lateral rolling, a horizontal cradle at one end of the track for receiving the pipe and for tipping the same to vertical position, and means actuated when the cradle is in horizontal position for lowering the pipe from the track into the cradle.

11. A pipe handling apparatus comprising, a track for supporting a pipe for lateral rolling, a cradle at one end of the track for receiving the pipe, and means actuated automatically for lowering the pipe from the track into the cradle, said means comprising an auxiliary track section disposed at the same level as the track, fluid pressure means for supporting said auxiliary track section and means operated by the rolling of a pipe section from the track onto the auxiliary track section for releasing the fluid pressure in said supporting means to effect a lowering of the pipe section.

12. A pipe handling apparatus comprising, a track for receiving a pipe for lateral rolling, a cradle at one end of the track for tipping a pipe section from vertical to horizontal position and delivering the pipe to the track, and means actuated automatically when the cradle has reached a position adjacent the end of said track for raising a pipe out of said cradle and for delivering it to said track.

13. A pipe handling apparatus comprising, a track for receiving a pipe for lateral rolling, a cradle at one end of the track for delivering a pipe thereto, and means actuated automatically for raising a pipe out of said cradle and for delivering it to said track, said means comprising an auxiliary track section disposed on a slant toward said track, fluid pressure means for supporting said auxiliary track section and means automatically operative upon positioning of the cradle at the end of the track for raising said auxiliary track section and effecting delivery of the pipe to the track.

CLAS S. LARSON.